Feb. 11, 1958  S. N. STEVENS  2,823,301
INSPECTION APPARATUS WITH CONSTANT HIGH INTENSITY LIGHT
Filed July 1, 1952
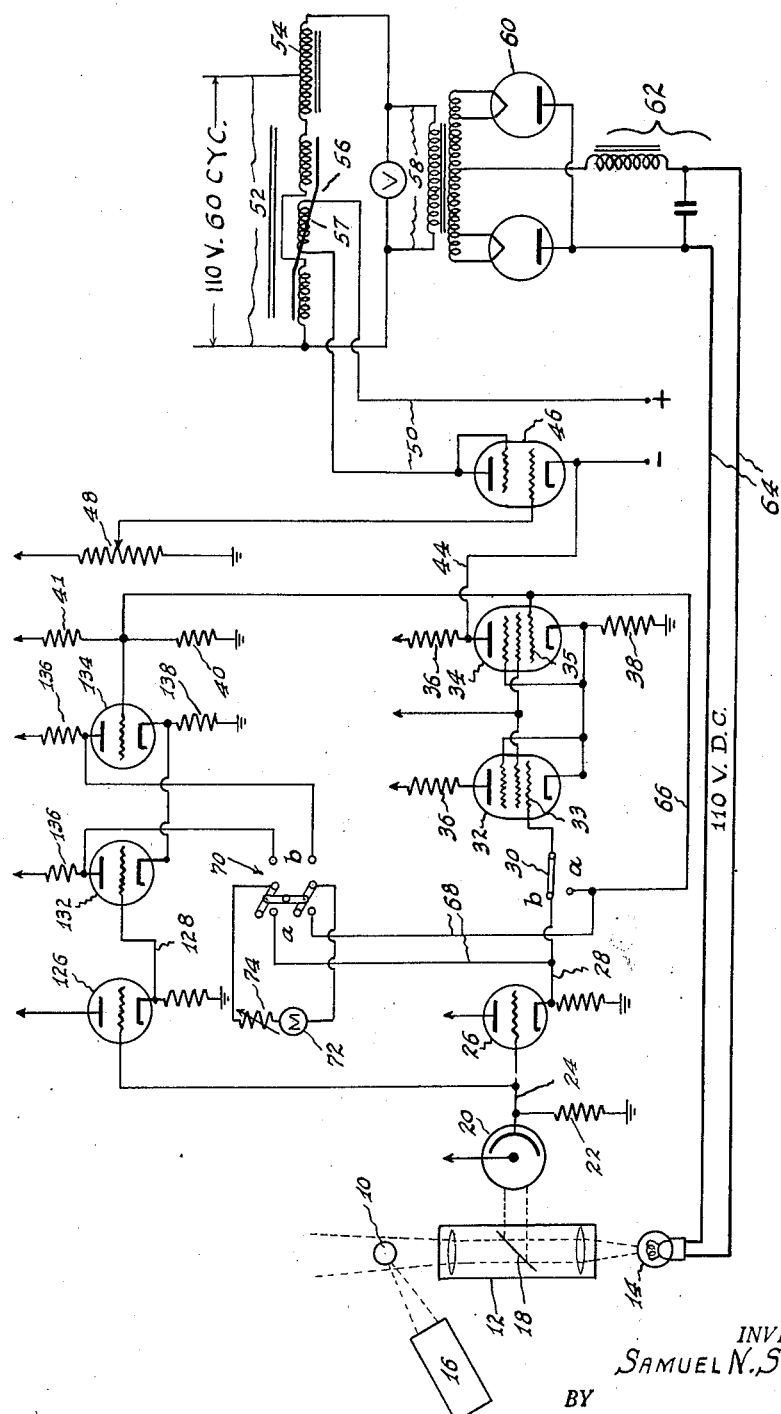
INVENTOR.
SAMUEL N. STEVENS,
BY
ATTORNEYS.

United States Patent Office 2,823,301
Patented Feb. 11, 1958

2,823,301

INSPECTION APPARATUS WITH CONSTANT HIGH INTENSITY LIGHT

Samuel N. Stevens, West Lafayette, Ind., assignor to The Timken Roller Bearing Company, Canton, Ohio, a corporation of Ohio Application July 1, 1952, Serial No. 296,697

4 Claims. (Cl. 240—41)

This invention relates to inspection apparatus which inspects on the basis of a light-reaction characteristic of the inspected work, for example, the light-reflectance characteristic of bearing roller surfaces; and relates especially to a means for controlling the intensity of illumination of the inspected work.

In inspection operations based on light reaction characteristics, for example, on reflectance characteristics of roller surfaces, a relatively powerful light source is desirable, and inspection accuracy requires illumination of constant intensity. It is the primary object of this invention to control a high output light source to provide constant light intensity. A further object is to provide an inspection apparatus and method responsive to light-reaction characteristics, and especially to light-reflectance characteristics of inspected work. A further object is to provide inspection apparatus of this type with manually adjustable means for setting the normal value of the high intensity light source, and with selectively operable means for visually observing any deviations of the intensity of the light source from its normal value.

In accordance with my invention, inspection pieces are illuminated from a high-output light source, such as an incandescent projection lamp, and observed by an inspection head responsive to a light-reaction characteristic, such as reflectance, transmittance, transluscense, etc. For control, part of the light output of the source is fed to a monitoring light-sensitive element, conveniently a photo-tube, in a circuit which produces a voltage potential that varies with the intensity of light falling on the photo-tube. Such potential may vary inversely with or directly with light-intensity variations.

The high-output light source is energized from an alternating current power line through a transformer, preferably an auto-transformer. The transformer output is regulated by a variable impedance device, preferably a saturable reactor connected in series with the transformer across the power line, which controls the voltage impressed across the transformer input and which itself is controlled by a low-power direct-current control circuit. The light-responsive voltage potential, acts in a direct-current-voltage amplifier, preferably a balanced bridge-type amplifier, to produce an amplified control potential; and this is impressed on an electronic reactor-control tube to control the current in the direct-current reactor-control circuit. The power supply to the light source is thus regulated in response to the light-responsive voltage potential, to produce a compensating decrease or increase in power to the light source as the result of any increase or decrease in its output intensity, which tends to maintain constant the intensity of light output from that light source.

The regulated alternating current output of the transformer may be used directly to energize the projection lamp; but preferably, that regulated alternating current output is rectified and filtered to provide a regulated direct-current output which is used to energize the projection lamp.

A manual adjustment is desirably provided for setting the control apparatus to normal operating balance. Conveniently, this adjusts the operating bias on the reactor-control tube. To facilitate this adjustment, I desirably provide switch means to apply a predetermined potential to the amplifier circuit in place of the output potential of the photo-tube circuit, and to establish a bridge circuit containing a meter responsive to the difference between the predetermined potential and the output potential of the photo-tube circuit. With the switch means in manual position, the light-energizing circuit is adjusted to regulate the light intensity to that normal value which makes the photo-tube output potential equal to the reference potential, and the switch means is then moved to automatic position.

As indicator circuit is also desirably provided, to indicate to the inspection operator any light-intensity variations which occur, both as a check on the automatic control and as a basis for evaluating inspection results. This is desirably arranged in parallel with the control circuit, and conveniently comprises a pair of electron tubes in a bridge-type amplifier circuit which is responsive to the predetermined potential and to the output potential of the photo-tube circuit and which activates an indicating meter. The meter may be the same as that used in the adjustment operation, and may be calibrated in percentage of light intensity variations.

The accompanying drawing illustrates the invention, and shows a diagrammatic plan view and circuit diagram of inspection and control mechanism embodying my invention.

In the mechanism shown in the drawing, a cylindrical bearing roller 10 to be inspected (shown in end elevation) is positioned in the beam of light projected onto it through a lens tube 12 from a high-intensity light source 14 such as an incandescent 500-watt projection lamp. Normally, the roller 10 is supported on a suitable spindle and is rotated on its axis of generation during its inspection. Inspection observation is made by an inspection head 16 which desirably observes a small inspection spot on the spinning roller surface and is moved to scan that surface during each inspection cycle, as is more fully shown in my copening application Serial No. 298,689, filed July 14,1952, Patent No. 2,738,197, issued March 13, 1956. Alternatively, the inspection head 16 may take its response from a linear area extending axially of the spinning roller surface. In either case, the inspection head 16 observes the reflectance characteristics of the spinning roller surface and such observation may be used to generate an electrical signal which is suitably interpreted, as by the interpretation system shown in my copending application Serial No. 250,338, filed October 8, 1951.

To control the intensity of light from the projection lamp 14, a beam-splitting mirror 18 is placed in the path of the light, to reflect a part of the light to a photo-tube 20. The photo-tube 20 is responsive to the light output of the lamp 14, and is connected in series with a resistor 22 between a positive voltage supply and ground, so that the voltage developed across the resistor 22 varies with the intensity of the light from the lamp 14. The voltage potential or signal produced at the upper end of the resistor 22 is utilized as the output of the photo-tube circuit.

The output from the photo-tube 20 is fed to a voltage amplifier through a cathode follower 26 which transmits the desired voltage signal but isolates the photo-tube circuit from the following amplifier circuit. The output line 28 from the cathode follower 26 thus carries an output signal similar to the output signal from the phototube circuit but at a slightly higher voltage. Desirably the line 28 contains a normally closed switch 30 for purposes to be described below.

The voltage amplifier comprises a pair of pentode tubes 32 and 34 connected in a bridge-type amplifier circuit. The plates of tubes 32 and 34 are respectively connected through plate resistors 36 to a positive voltage supply. The cathodes of the two tubes 32 and 34, and their connected suppressor grids, are connected together and to a common cathode resistor 38. The grid 33 of the tube 32 is connected to the output line 28 from the cathode follower. The grid 35 of the tube 34 is connected between the two resistors 40 and 41 of a voltage divider at a point of predetermined voltage corresponding to the normal voltage appearing on the grid of tube 32 when the light output of the projection lamp 14 is at the desired intensity. The plate resistors 36 of the two tubes are equal, and the two tubes 32 and 34 should have matched operating characteristics. The normal currents of the tubes 32 and 34 develop in the common cathode resistor 38 a voltage sufficient to bias the tubes 32 and 34 to a point at which current flow through each tube causes the appearance of a voltage across its plate resistor 36 of approximately one-half the applied plate voltage. "Bias" is used in the sense of making the grid of the tube negative with respect to the cathode.

In operation of the amplifier, if the input potential on the grid 33 of the tube 32 should rise, there would be a resulting increase in the current flowing through the tube 32, and this in turn would tend to increase the voltage appearing across the cathode resistor 38. Since this resistor is common to the cathode of tube 34, the resulting increase in potential at the cathode of tube 34 tends to bias that tube more strongly and to reduce the current flowing through its plate circuit. The drop in current in the tube 34 tends to reduce the voltage developed across the common cathode resistor 38, and this effect is opposite to that caused originally by the increase of voltage on the grid of tube 32. The net result is that the operating point of the circuit is changed and tends toward a condition in which the voltage increase across the cathode resistor 38 is slightly less than half the voltage increase applied to the grid of tube 32, the slight difference from half being due to the fact that the screen currents of both tubes also flow through the common cathode resistor and do not change significantly. Under the operating conditions produced by the increase of potential at the grid 33 of the tube 32, its current is increased while the current in tube 34 is decreased, with the result that the potential at the plate of tube 34 is increased.

A decrease in the potential of the grid 33 of the tube 32 produces corresponding results in the amplifier circuit containing the tubes 32 and 34 in an opposite sense from those produced by an increase in grid 33 potential as described above; and a decrease in grid 33 potential thus results in a decreased voltage at the plate of the tube 34.

There is thus produced at the plate of the tube 34 an amplified increase or decrease in potential varying with the increased or decrease of the input potential applied to the grid 33 of the tube 32.

While an amplified output could be taken from the plates of tubes 32 and 34 in other ways, I find it convenient to use the potential appearing at the plate of tube 34. Such potential is applied to a control tube 46 to control the current in a control circuit 50. The cathode of the tube 46 is connected to the output lead 44 from the plate of tube 34. The grid of tube 46 is connected to a variable point on a potentiometer 48 connected between a positive voltage source and ground. The adjustment of the potentiometer adjustably fixes the operating level of the tube 46 with respect to ground; and the power source for the control circuit 50 floats with respect to ground to permit its cathode to follow the input potential from the plate of tube 34.

The source of power for operating the incandescent lamp 14 is a 110 volt, 60 cycle, alternating current power line 52. This is connected to an auto-transformer 54 and a saturable reactor 56 which are in series across the power line 52 and which have a connected output line 58. The saturable reactor 56 contains a direct-current control winding 57 forming part of the control circuit 50 governed by the current control tube 46.

The saturable reactor 56 forms a variable impedance in series with the auto-transformer 54, which by reason of its own variation varies the voltage impressed across the input of the auto-transformer, and by this variation of input voltage regulates the output voltage of the combination. The saturable reactor itself is controlled by its control winding 57. An increase of direct current in that winding 57 increases the flux density in the reactor core, and hence the magnetic saturation of that core, and this decreases the impedance of the reactor. Similarly, a decrease of current in the control winding causes an increase in the reactor impedance. Variations in reactor impedance vary the voltage division between the reactor and the transformer, and thus vary the voltage across the input of the transformer and vary correspondingly the transformer output.

The current control tube 46 is normally biased by adjustment of the potentiometer 48 to a point such that the current supplied to the reactor control winding 57 by the control circuit 50 produces a transformer output at a level, say 110 volts to energize the light source to the desired intensity.

The power output line 58 carries alternating current, which can be used as such to energize the projection lamp 14, although this would tend to produce cyclic variations in the output from the projection lamp, which would produce a cyclic variation or ripple in the photo-tube output. While the ripple in the photo-tube output could be eliminated with a suitable filter, the cyclic variation of light intensity is undesirable for the inspection operation; and I prefer to rectify the alternating current in the controlled output line 58, and to energize the projection lamp with direct current derived therefrom. To this end, the controlled output line 58 is connected to a full-wave rectifier 60 comprising a pair of tubes suitably connected to a winding across the output line 58. The output from the rectifier 60 is passed through a filter 62, and the output line 64 therefrom is connected to the projection lamp 14.

If the light output of the lamp 14 should increase in intensity, as from a voltage increase in the power line 52, the increased light acts on the photo-tube 20 to raise its output potential. This potential rise is transmitted through the cathode follower 26 to the amplifier circuit, which in consequence will produce an amplified potential increase at the plate of its tube 34. Such amplified potential increase, impressed on the cathode of the reactor-control tube 46, will increase the bias of that tube and produce a resulting decrease of current in the control circuit 50 and the reactor-control winding 57. This will increase the impedance of the reactor, with the result that a greater portion of the power line voltage will appear across the reactor and that a lesser portion will appear across the transformer. The reduced voltage across the input of the transformer will correspondingly reduce its output, and thus decrease the power supplied from the transformer to the light source. The reduced power will lower the light intensity, to overcome the original increase in light intensity and thus to bring the light intensity back to its desired value.

If the light output decreases, as from a voltage drop in the power line 52, a corresponding control action occurs, in an opposite sense, to increase the power to the light source and bring its intensity up to the desired value.

The control action is prompt and compensates for light variations as they start, with the result that light intensity is maintained close to a constant value.

The switch 30 referred to above is provided for convenience of adjustment in putting the light control mechanism in operation. By movement of such switch from its normal "automatic" position $b$ to its "manual" position $a$, it disconnects the grid of tube 32 from the cathode follower 26 and connects it to a line 66 which puts that grid at the same predetermined potential as the grid of tube 34. A pair of wires 68 connected to the cathode-follower output line 28 and the predetermined potential line 66 lead to a second switch 70 which in its "manual" position $a$, connects those lines 28 and 66 to opposite sides of a voltmeter 72 whose sensitivity is controlled by a potentiometer 74 in series with it.

With the switches 30 and 70 closed in their manual positions $a$ a bridge circuit is established which interposes the meter 72 between the output line 28 of the cathode follower 26 and the predetermined potential line 66, to indicate any voltage difference between those lines. Meanwhile, the same predetermined potential is impressed on the grids of both tubes 32 and 34 of the amplifier circuit so that it is in normal equilibrium condition and applies a normal voltage to the cathode of the reactor control tube 46, equivalent to that which would appear under automatic operation when the light is at the desired intensity. Under these conditions, the potentiometer 48 is adjusted to adjust the grid bias of the reactor control tube 46, and thus to vary the current flowing in the control circuit 50 and the control winding 57 of the saturable reactor 56. This in turn adjusts the controlled output from the power line 52 by which the projection lamp 14 is energized. The resulting adjustment of power to the projection lamp causes a corresponding change in the light reaching the photo-tube 20, and causes a corresponding change of voltage in the output line 28 from the cathode follower 26 to the meter 72. The power is thus adjusted until the meter shows no voltage drop across it, under which conditions, the light-responsive signal in the output from the cathode follower 26 will be the same as the predetermined voltage reaching the amplifier from the voltage divider 40—41. The switch 30 can now be returned to its automatic position $b$, and the switch 70 opened, to put the control device into automatic operation. So long as the light intensity remains constant the light-responsive voltage now applied to the grid 33 of the tube 32 will remain at the adjusted value, equal to the predetermined potential applied to the grid 35 of the tube 34. Variations from this condition of equivalent voltages on the grids 33 and 35 will result in automatic compensating control as described above.

An observation circuit is desirably provided, by which light-intensity variation and control may be observed either visually or upon some recording apparatus. To this end, a second cathode follower 126 is connected to the output line 24 from the photo-tube circuit, and such cathode follower 126 is made as nearly as possible with the same operating characteristics as the first cathode follower 26. Between the output line 128 of the second cathode follower 126 and the point of predetermined voltage on the voltage divider 40—41, there is interposed an amplifying bridge circuit comprising a pair of triode tubes 132 and 134. The plates of these tubes are connected through plate resistors 136 to a source of positive voltage, and their cathodes are connected to a common cathode resistor 138. The grid of tube 132 is connected to the output line 128 from the cathode follower 126, and the grid of tube 134 is connected to the point of perdetermined voltage on the voltage divider 40—41. The plates of the two tubes 132 and 134 are respectively connected to a pair of contacts engaged by the switch 70 when in position $b$ to connect the meter 72 and its sensitivity control potentiometer 74 between the plates of those two tubes.

When the light intensity of the lamp 14 remains constant at the desired level, the potential impressed on the grid of the tube 132 will be equivalent to the fixed potential applied to the grid of the tube 134, and equal currents will flow through the tubes 132 and 134, their plate potentials will be equal, and meter 72 will read at the "0" position. In the event of an increase in light intensity, the photo-tube current will increase, causing an increase in potential in the output line 128 applied to the grid of tube 132. This will cause increased current in that tube and a consequent tendency to increase the voltage drop across the common cathode resistor 138. Any such increased voltage drop will increase the potential of the cathode of tube 134, increasing the bias of that tube and decreasing its current. A decrease in current in the tube 134 will tend to decrease the voltage drop across the common cathode resistor 138 in opposition to the increasing tendency resulting from increased current in the tube 132.

The resulting increased current in tube 132 and decreased current in tube 134 will respectively decrease and increase the plate potentials of the two tubes, and the difference in such plate potentials will be reflected in the reading given by the meter 72. A decrease in light intensity will produce similar but opposite results in the observation circuit. The meter 72 is desirably a center-reading type, which can be adjusted to proper sensitivity and calibrated to read in terms of percent variations in light intensity from the desired operating level. The observation circuit and meter 72 provide a convenient check on the operation of the control circuit and upon the reliability of the inspection results.

I claim as my invention:

1. In inspection apparatus responsive to light-reaction characteristics of inspected work, a high-intensity light source for illuminating the inspected work, a light-sensitive element responsive to intensity of light output from said light source for generating a voltage potential varying with the intensity of light from said light source, voltage amplifying means responsive to said varying voltage potential, an alternating current power line, a transformer and variable impedance device in series across said power line, said impedance device having a control winding in which varying direct current varies the impedance of the device, a direct-current supply circuit for said winding controlled by a control tube which itself is controlled by said voltage amplifying means, and a transformer output circuit connected to energize said light source, said voltage amplifying means comprising a pair of electron tubes connected in a bridge-type amplifying circuit between said light-sensitive element and a source of predetermined potential, a bridge circuit interposed in parallel therewith between said light sensitive element and said source of predetermined voltage potential, said bridge circuit containing an indicating device to indicate variations of the output potential of said light sensitive element with respect to said predetermined potential.

2. Apparatus according to claim 1 with the addition of switching means to connect the light-sensitive-element end of said amplifying circuit to said source of predetermined potential, to stabilize the amplifying circuit, and for connecting said indicating device between said light sensitive element and said predetermined potential source, and means to adjust said direct-current supply circuit while said amplifying circuit and indicating means are thus connected.

3. In inspection apparatus responsive to light-reaction characteristics of inspected work, a high-intensity light source for illuminating the inspected work, a light-sensitive element responsive to intensity of light output from said light source for generating a voltage potential varying with the intensity of light from said light source, voltage amplifying means responsive to said varying voltage potential, an alternating current power line, a transformer and variable impedance device in series across said power line, said impedance device having a control winding in which varying direct current varies the impedance of the device, a direct-current supply circuit for said winding controlled by a control tube which itself is controlled by said voltage amplifying means, and a transformer output circuit connected to energize said light source, said voltage amplifying means comprising a pair of electron tubes connected in a bridge type amplifying circuit between said light sensitive element and a source of predetermined potential, switching means to connect said predetermined-potential source to both sides of said amplifying circuit, to stabilize the same, and to connect an indicating means between such source and said light-sensitive element, and means to adjust said direct-current supply circuit while said amplifying circuit and indicating means are thus connected.

4. In inspection apparatus responsive to light reaction characteristics of inspected work, a direct current lamp, means directing light therefrom in an inspection beam having a normal high operating intensity, an A. C. power source including a variable impedance reactor having a direct current winding the current in which controls the variable impedance of the reactor and thereby controls the output of the A. C. power source, a control circuit responsive to deviations in intensity of the inspection beam and having a direct current output connected to the direct current winding of the reactor to control the variable impedance thereof, and rectifier-filter circuit connected between the so-controlled A. C. power source and the lamp for supplying non-pulsating current to energize said lamp, said rectifier-filter circuit being energized by the A. C. power source under control by said control circuit in response to deviations of intensity in the inspection beam, said control increasing the output of said rectifier-filter circuit to the lamp when the intensity of the beam decreases and decreasing the output thereof when the intensity of the beam increases, whereby to maintain said beam at uniform intensity free of fluctuations occurring in the A. C. power source.

References Cited in the file of this patent

UNITED STATES PATENTS

| | | |
|---|---|---|
| 2,242,638 | Balsley | May 20, 1941 |
| 2,246,501 | Bradner et al. | June 24, 1941 |
| 2,269,324 | Turner et al. | Jan. 6, 1942 |
| 2,407,564 | Martin et al. | Sept. 10, 1946 |
| 2,433,624 | Rabinowitz | Dec. 30, 1947 |
| 2,451,501 | Liben | Oct. 19, 1948 |
| 2,537,914 | Roop | Jan. 9, 1951 |
| 2,567,896 | Semm | Sept. 11, 1951 |
| 2,573,554 | Dwyer | Oct. 10, 1951 |
| 2,607,899 | Cary et al. | Aug. 19, 1952 |